United States Patent [19]

Czernik

[11] Patent Number: 4,997,193
[45] Date of Patent: Mar. 5, 1991

[54] OIL PAN GASKET AND METHOD OF MAKING SAME

[75] Inventor: Daniel E. Czernik, Hinsdale, Ill.

[73] Assignee: Fel-Pro Incorporated, Skokie, Ill.

[21] Appl. No.: 525,592

[22] Filed: May 18, 1990

[51] Int. Cl.⁵ .............. B65D 53/00; F02F 11/00; F16J 15/00; F16K 41/00

[52] U.S. Cl. .................. 277/233; 277/207 R; 277/211; 277/235 R; 123/198 E; 184/106

[58] Field of Search .............. 277/180, 166, 233, 234, 277/235 R, 235 A, 235 B, 207 R, 211; 123/198 E; 184/106

[56] References Cited

U.S. PATENT DOCUMENTS

| | | |
|---|---|---|
| 3,913,927 | 10/1975 | Gordon ............ 277/235 B X |
| 3,936,059 | 2/1976 | Gordon ............ 277/166 |
| 4,402,518 | 9/1983 | Locacius ............ 277/166 |
| 4,535,996 | 8/1985 | Cardis et al. ............ 277/1 |
| 4,597,583 | 7/1986 | Inciong et al. ............ 277/235 B |
| 4,655,463 | 4/1987 | Inciong et al. ............ 277/180 |
| 4,754,982 | 7/1988 | Udagawa et al. ............ 277/235 B |

Primary Examiner—William A. Cuchlinski, Jr.
Assistant Examiner—James K. Folker
Attorney, Agent, or Firm—Dressler, Goldsmith, Shore, Sutker & Milnamow, Ltd.

[57] ABSTRACT

A generally rectangular, flat gasket for use in sealing oil pan covers. The gasket has a main body with a rigid core and facing layers. The ends of the main body have a greater thickness than that of the main body. The gasket may be shipped in a flat condition, but is bendable in the zones of the ends to form arched ends for sealing purposes. A method of making such a gasket is also disclosed.

7 Claims, 1 Drawing Sheet

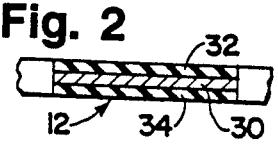
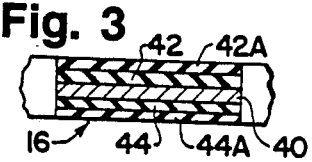
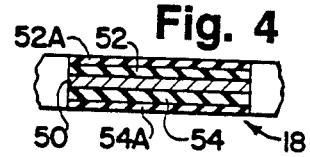
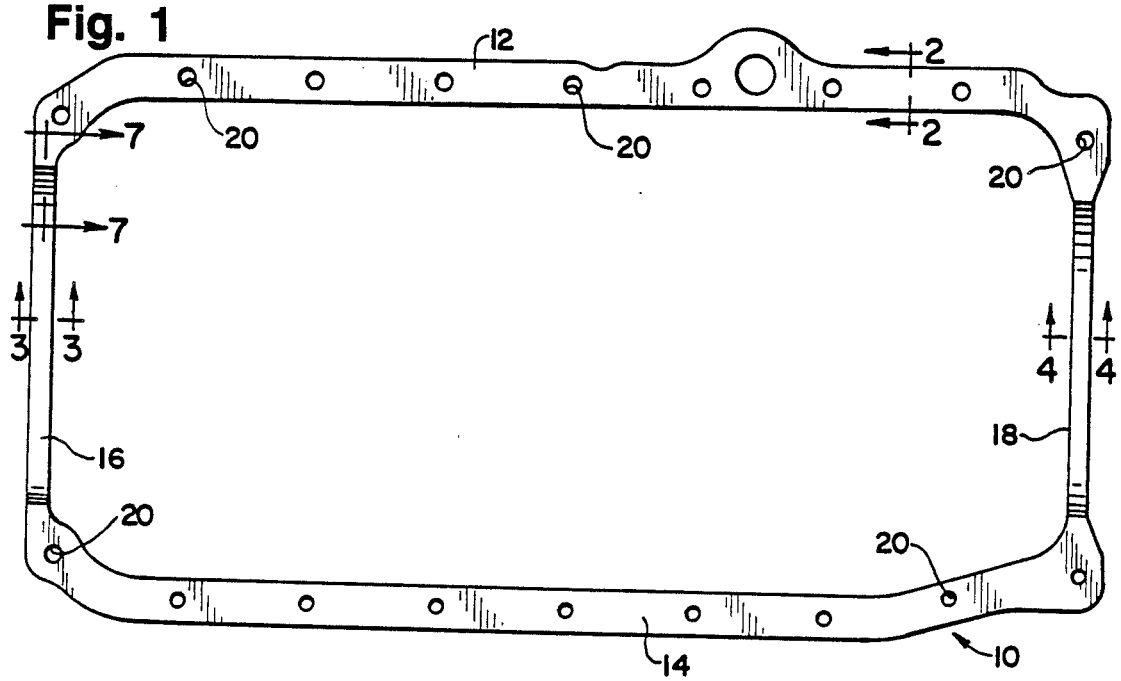
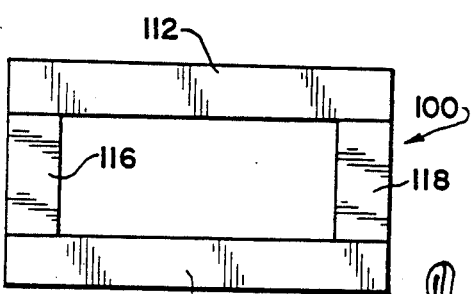
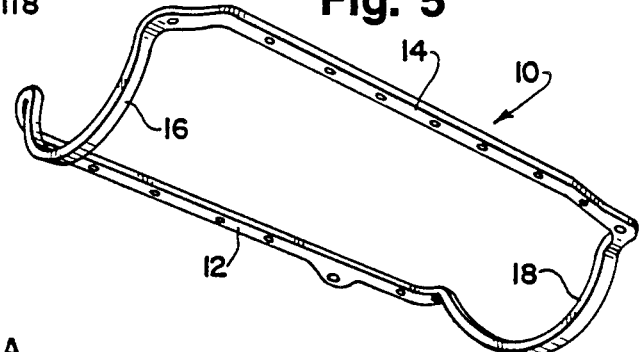
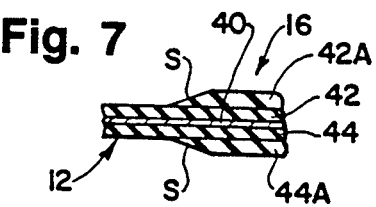

4,997,193

1

OIL PAN GASKET AND METHOD OF MAKING SAME

BACKGROUND OF THE INVENTION

At present, oil pan gaskets are typically elongated, relatively large, molded rubber gaskets which have substantial U-shaped or arched segments at each end. A typical such gasket is shown in U.S. Pat. No. 4,535,996. The manufacture of such gaskets is expensive because of the large, expansive molds required. Further the packaging of such gaskets requires a relatively large container which takes up substantial space both for shipping and storage, adding to the expense of such gaskets.

It would be desirable to provide a gasket useful for sealing oil pans and the like which does not require large, expensive molds and which when finally formed, can be shipped and stored in a generally flat condition, but which, when ready for installation, can easily be made to assume the required shape for use, such as in the oil pan sealing environment for which the gasket was designed.

SUMMARY OF THE INVENTION

An improved gasket, such as one which may be used in an oil pan sealing environment, is of a generally rectangular configuration, and has a pair of sides and a pair of ends each defining elongated and expansive surfaces in plan view, the sides being of a first thickness and the ends being of second and third thicknesses which may be different from each other and which are greater than the first thickness. Each of the sides and ends has a central rigid core, such as a metallic core, having upper and lower surfaces and facing layers adhesively secured to and covering the upper and lower surfaces of the core. The gasket is flat, but the ends are bendable to assume and maintain arched configurations in use.

Preferably the facing layers include a corkrubber composite and the end facing layers comprise a laminate of at least two layers, desirably of a similar material, although the layers may be of dissimilar materials as well.

The improved method of making a flat gasket bendable at its ends for forming the gasket ends into arched configurations in use in accordance with this invention comprises the steps of providing a generally rectangular flat gasket body of a first thickness having a central rigid core, preferably of metal, and facing layers on the upper and lower surfaces of the core, the gasket body having a pair of sides and a pair of ends, and securing sealing segments to the ends to increase the thickness of the gasket body at the ends to thicknesses thereat which are greater than the first thickness, and which may be different in thickness from each other as well.

The method may also comprise the step of securing sealing segments of a material which is similar to the facing layers or dissimilar to the facing layers. The sealing segments may be molded rubber segments secured by adhering them to the facing layers at the ends.

Further objects, features and advantages of the present invention will become apparent from the following description and drawings.

BRIEF DESCRIPTION OF THE DRAWINGS

FIG. 1 is a plan view of a gasket of the present invention;

FIG. 2 is a cross-sectional view taken substantially along line 2—2 of FIG. 1;

FIG. 3 is a cross-sectional view taken substantially along line 3—3 of FIG. 1;

FIG. 4 is a cross-sectional view taken substantially along line 4—4 of FIG. 1;

FIG. 5 is a perspective view of the gasket of FIG. 1 when bent from the flat shape of FIG. 1 to the shape in which it is used in its sealing environment.

FIG. 6 is a plan view of an assembled lattice from which the main gasket body of FIG. 1 may be cut;

FIG. 7 is a cross-sectional view taken substantially along line 7—7 of FIG. 1; and FIG. 8 is a cross-sectional view of another embodiment taken in a location like that of FIG. 3.

DESCRIPTION OF A PRESENTLY PREFERRED EMBODIMENT

Referring now to the drawings, a gasket such as a generally rectangular oil pan gasket 10 in accordance with the present invention may include a pair of sides 12, 14 and a pair of ends 16, 18. As is conventional, sides 12, 14 define suitable openings, such as bolt holes 20, so that when gasket 10 is positioned, as between an engine and an oil pan, clamping bolts (not shown) may secure the gasket in its proper predetermined position, as in a manner typically illustrated by U.S. Pat. No. 4,535,996.

The oil pan gasket 10 is formed to have a central rigid, but flexible, core, such as the metallic core shown or a plastic core, having upper and lower surfaces and facings, as of a suitable cork-rubber composition, secured to the upper and lower surfaces of 30 the core. As best seen in FIGS. 1–4, the sides 12, 14 comprise a central metallic core 30, and cork rubber facings 32, 34. End 16 comprises a central metallic core 40, and cork rubber facings 42, 44. End 18 comprises a central metallic core 50, and cork-rubber facings 52, 54. In this embodiment, the segments comprising the cores 30, 40, 50 may be integrally formed of steel and may be of the same thickness, such as from about 0.0054 to about 0.0074 inch thick. The segments comprising the facings 32, 42, 52 and 34, 44, 54 may be of thicknesses of about 0.065 to 0.085 inch.

As may best be seen in FIGS. 1–4, the ends 16, 18 are of thicknesses different from, and greater than, the thickness represented by facings 32, 34, 42, 44, 52 and 54. Thus end 16 has aggregate facing thicknesses (42, 42A and 44, 44A) of about 0.235 to 0.265 inch and end 18 has aggregate facing thicknesses (52, 52A and 54, 54A) of about 0.140 to 0.160 inch.

Suitable cork-rubber composite facings may comprise sheet material having approximately 35 to 50 percent cork and 50 to 65 percent rubber by weight. The cork constituent may comprise particles ranging from about 10 to 20 mesh in accordance with ASTM-11 sieve standards, and a suitable rubber may be a nitrile rubber. Fillers may be used as well.

Gasket 10 is manufactured in the shape shown in FIG. 1 and is preferably made in a flat condition. After the base or main gasket body is made the supplemental facing segments 42A, 44A, 52A and 54A are secured, as by adhesively securing them to the main gasket body to provide laminates thereat.

Of course, in use the gasket 10 needs to assume a shape, typically as illustrated by the perspective view showing of FIG. 5, with ends 16, 18 being U-shaped or arched. It is readily so shapeable because of the material of which it is made with the flexible, rigid core, such as the metallic core, serving to provide the necessary flexibility, rigidity and body.

Referring now to FIG. 6, blank 100 may be made in a known manner, as by skiving sheets of cork rubber of a desired thickness from a matrix of adhered blocks of cork rubber material adhered along the lines of intersection of side segments 112, 114 and end segments 116, 118. These sheets are then adhered in known fashion to the upper and lower surfaces of a rigid core, such as a metallic core of like shape to form the laminated blank 1. The core may be surface modified, as by etching or otherwise to enhance securance. The adhesive may be a heat-activatable adhesive or a conventional "wet" adhesive. Suitable heat-activatable adhesives include phenolic-nitrile rubber and polybutyral rubber which is initially applied to the facing sheet, following which the facing sheets are applied to the core surfaces.

The blank 100 may then be punched, die cut or otherwise formed to assume the shape, in plan view, of FIG. 1. Thereafter the additional facing segments 42A, 44A, 52A and 54A may be adhered, as desired, by a suitable adhesive to the gasket body facings to provide the desired thicknesses for the ends 16, 18.

After the additional segments are secured to the cut out gasket, the edges of the cork-rubber, as desired or necessary, may be skived, as shown in exemplary fashion at S in FIG. 7, at selected surfaces. Such skiving may be necessary or desirable to provide a gasket which seals most effectively.

Although it is the least desirable from a material waste standpoint, a gasket such as gasket 10 may be cut or punched out from a full-sized sheet of suitable material, such as a sheet comprising a metallic core and facing layers, following which suitably dimensioned additional segments of cork-rubber facings may be located, as at the ends, to build up the thicknesses at those locations as desired. The full sheet may then be punched out to assume the desired configuration in plan view, such as the typical shape of the gasket shown in FIG. 1, with the additional facing laminations being added either before or after punching or cutting.

Although the gasket 10 has been illustrated as having additional facing segments added or laminated to both sides of the main gasket body to provide additional thickness on both facing layers at the ends, it is also possible to provide segments on one side only, thus omitting, for example, additional segments 44A and 54A.

As another alternative, the additional facing segments may be of dissimilar materials, such as of molded rubber laminations for securance as segments 42A, 52A, or as segments 42A, 44A, 52A, 54A, thereby providing an alternative or additional material to secure the benefits of its more desirable or advantageous sealing characteristics for a selected application.

Yet another alternative contemplates the use of facings other than cork rubber, such as rubber, fiber-rubber facings, and the like. Although such facings may be generally flat, with additional laminations added to provide the greater thicknesses at the ends of the gasket, in the case of rubber, molded facings having thickened end zones could be used as well. In any event, if molded rubber end zones or segments are used, they can be shaped in cross-section to provide for enhanced sealing by providing a configuration even more closely complementary to the surface against which the gasket is to seal, as is illustrated by FIG. 8 which is a view taken in the same location as FIG. 3, but which is molded to a desired shape. Typical suitable rubber materials include nitrile, polyacrylic and silicone rubbers.

In the foregoing examples the core provides body for the gasket and facilitates its shaping for use from the flat shape of manufacture and shipping and storage of FIG. 1 to the arched configuration of FIG. 5.

The gasket as described is an oil pan gasket for use in the environment in which such gaskets are needed. A similar application for a gasket having arched ends which are typically molded with the ends in the arched condition, but which advantageously could be made and shipped in a flat condition, is for sealing overhead cam covers. As such, where ends of a differential thickness from that of the main body or sides are required in such a gasket, the principles of the present invention are equally applicable.

From the foregoing, it will be apparent to those skilled in the art that further modifications may be made and provided without departing from the spirit of the invention. Accordingly, the scope of the invention is to be considered to be limited only to the extent made necessary by the appended claims.

What Is Claimed Is:

1. A gasket of a generally rectangular configuration having a pair of sides and a pair of ends each defining elongated and expansive surfaces in plan view, said sides being of a first thickness and said ends being of second and third thicknesses greater than said first thickness, each of said sides and ends having a central rigid core having upper and lower surfaces and facing layers covering said upper and lower surfaces, said gasket being flat, but said ends being bendable to assume and maintain arched configurations in use.

2. The gasket of claim 1, and wherein said facing layers comprise a cork-rubber composite and said end facing layers comprise a laminate of at least two layers.

3. The gasket of claim 2, and wherein each of said at least two layers is of a similar material.

4. The gasket of claim 1, and wherein each of said at least two layers is of a dissimilar material.

5. The gasket of claim 1, and wherein said central core is a metallic core and said second and third thicknesses are different from each other.

6. The gasket of claim 1, and wherein the facing layers at said ends comprise first facing layers secured to said upper and lower surfaces and a rubber layer secured to at least one of the first facing layers at each end.

7. The gasket of claim 6, and wherein said rubber layer is a molded rubber layer.

* * * * *